United States Patent Office 3,193,455
Patented July 6, 1965

3,193,455
BIRD CONTROL AND BIRD MANAGEMENT COMPOSITIONS
Andrew J. Reinert, Bartlesville, Okla., assignor to Phillips Petroleum Company, a corporation of Delaware
No Drawing. Filed Oct. 22, 1962, Ser. No. 232,244
15 Claims. (Cl. 167—46)

This invention relates to the control of birds. In one aspect, the invention relates to novel bird management products. In another aspect this invention relates to a process for preparing bird management products. In still another aspect, the invention relates to a method for reducing the number of birds in an area.

The control of birds is a major problem which faces both rural and urban areas. For example, farmers lose large amounts of grain by bird consumption and large amounts of money are spent in cities attempting to avoid the nuisance created by birds. Moreover, flocks of birds in the runway area endanger airplanes which are landing or departing.

Various means have been employed for the control of birds including such methods as scare-crows, noise makers, poisons, etc. More recently, a new method for controlling birds by preventing large flocks from frequenting specific locations has been developed. U.S. Patent 3,044,930, filed December 8, 1960, Goodhue et al., and the application of L. D. Goodhue et al., Serial No. 152,005, filed November 13, 1961, now U.S. Patent No. 3,113,072, describe in detail and claim a process by which birds are controlled using bird management chemicals. According to these applications, various heterocyclic nitrogen-containing compounds are incorporated in bird foods and, when a bird eats a small amount of the treated food, the actions of the bird, including warning cries emitted, drive other birds away from the area.

Certain types of birds are very difficult to control because they will not accept the usual baits. Birds which are particularly difficult to control are starlings, grackles, blackbirds and cowbirds. These particular birds are difficult to control because they will not accept most conventional baits such as grains. Starlings are particularly difficult to control for this reason as they do not feed on most of the conventional bird feeds when offered such baits in populated localities. This is further complicated by the fact that starlings generally roost in urban areas and feed in rural areas of the surrounding countryside.

Starlings represent a very great problem in the country today both of the rural and urban type. In large cities, starlings roosting on buildings represent a major problem, particularly in maintaining clean window ledges, sidewalks, and the like. On the other hand, in rural areas the birds eat tremendous amounts of animal food and cause further difficulties by aiding in the transmission of various livestock diseases, many of which cause the loss of livestock valued in the millions of dollars each year. Thus, it can be seen that there is a distinct need for a composition that will both attract starlings and other birds that are difficult to control so that they can be subjected to the action of a bird control chemical.

Accordingly, an object of this invention is to provide an improved bait for the control of birds.

Another object of this invention is to provide a bird control composition including a bait and chemical compound capable of controlling birds such as starlings, grackles, blackbirds, cowbirds and the like.

Another object of this invention is to prepare bird management products.

Another object of this invention is to control birds using bird management chemicals.

Other objects, aspects and the several advantages of this invention are apparent from a study of this disclosure and the appended claims.

According to the invention, it has been discovered that peanut butter admixed with a bird food such as a milled grain provides a very desirable bird bait composition for the control of birds. It has been further found that such a bait composition that has been treated with a bird control chemical provides an excellent bait and bird management product for the control of starlings, grackles, blackbirds, cowbirds and the like.

It has been found that the above species of birds, in particular, readily accept the peanut butter-containing bait. Moreover, it has been found that the activity of these birds can be readily controlled by subjecting them to the action of a desired bird management chemical by incorporating a suitable bird management chemical into the peanut butter-containing bait.

It is within the scope of the invention to provide a composition or bait comprised of peanut butter admixed with bird food particles, e.g., milled grain such as corn grits, corn meal, ground wheat, ground oats, ground barley, or other milled grain having incorporated therein either a bird poison (avicide) or a bird management chemical effective for reducing the number of birds in a particular area.

If it is desired to rid an area of birds, i.e. kill the birds, suitable poisons, such as strychnine, arsenic, and other materials poison to the birds, can be incorporated in the peanut butter-milled grain bait composition of the invention. Alternatively, if it is desired to reduce the number of birds in an area by driving them away through the action of a bird management chemical, the peanut butter-milled grain bait composition of the invention can be treated with suitable bird management chemicals such as set forth below. Birds that have ingested a portion of the composition of the invention containing a bird management chemical will emit warning cries or distress calls to other birds in the area, thus serving to drive the other birds from the area.

The preferred bird management chemicals utilized in the practice of the invention are heterocyclic nitrogen-containing compounds having a structural formula selected from:

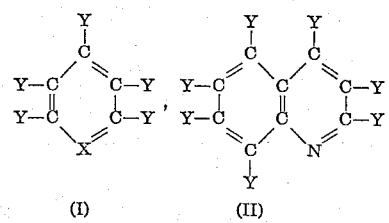

(I)        (II)

and

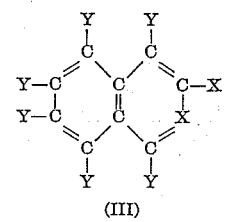

(III)

wherein (1) X is selected from the group consisting of

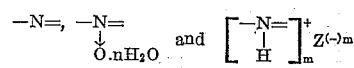

(2) $n$ is an integer selected from the group consisting of 0, 1 and 2, (3) Y is selected from the group consisting of hydrogen, chlorine, nitro, bromine, alkyl and alkoxy radicals containing from 1–4 carbon atoms, inclusive, aralkoxy radicals containing from 7–10 carbon atoms, inclusive,

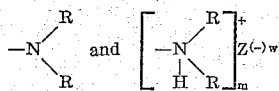

and wherein R is selected from hydrogen and alkyl radicals containing from 1–4 carbon atoms, and wherein at least one of said Y groups is nitro,

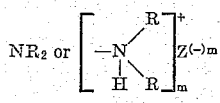

when X is —N=,
(4) Z is an anion of an acid selected from the group consisting of mono-, di- and trivalent inorganic and organic acids,
(5) $m$ is an integer selected from the group consisting of 1, 2 and 3 and is equal to the valence of the anion Z,
(6) when Z is an anion of a di- or trivalent acid, the multiple monovalent cationic group can be located on the same or different molecules, and
(7) when X is

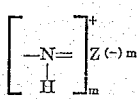

and Y is

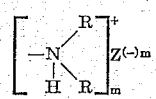

Y is located in the 3-position with respect to the X group.

Some illustrative examples of anions which are represented by Z in the above general formulas are chloride, bromide, iodide, fluoride, nitrate, sulfate, phosphate, nitrite, acetate, propionate, butyrate, oxalate, malonate, succinate, tartrate, phthalate, benzoate, citrate and the like.

The compounds of Formula I above are the most preferred, and it is preferred that only one of said Y groups be either an amino or nitro group. It is also preferred that said R groups on the amino nitrogen group be hydrogen. Furthermore, it is preferred that not more than one of said Y groups be alkyl. As to position, it is preferred that said amino or nitro group be located in the 4-position and if one of said Y groups is alkyl, it is preferred that said alkyl be located in the 3-position. It is further preferred to employ the salts when treating grain with amino-substituted pyridines to avoid an odor and discoloration problem often encountered with grain treated with amino-substituted pyridines.

Representative specific heterocyclic nitrogen-containing compounds that can be employed according to the invention include:

Pyridine-N-oxide
Quinoline-N-oxide
Quinoline-N-oxide dihydrate
4-methoxy-pyridine-N-oxide
4-nitro-2-methyl-5-ethylpyridine-N-oxide
4-chloropyridine-N-oxide
2-methyl-5-ethyl-6-nitropyridine-N-oxide
4-benzyloxypyridine-N-oxide
4-nitropyridine-N-oxide
4-nitro-3-methylpyridine-N-oxide
4-aminopyridine
4-aminopyridine-N-oxide
4-amino-3-methylpyridine
4-amino-3-methylpyridine-N-oxide
4-(N-methylamino)pyridine-N-oxide
4-(N,N-dimethylamino)pyridine-N-oxide
3-aminopyridine
3-aminopyridine-N-oxide
2,6-diaminopyridine
4-amino-2,6-dimethylpyridine
4-amino-2-methylquinoline
4-amino-2-methylquinoline-N-oxide dihydrate
4-aminoquinoline
4-aminoquinoline-N-oxide
4-amino-2,6-dimethylquinoline
3-aminoisoquinoline
4-amino-2-methyl-5-ethylpyridine
4-nitropyridine
4-nitro-3-methylpyridine
4-nitro-2-methyl-5-ethylpyridine
3,5-dinitropyridine
3-nitroquinoline
4-nitro-2,8-dimethylquinoline
5-nitroisoquinoline
4-nitro-3-methylisoquinoline
4-aminopyridinium chloride
4-pyridylammonium chloride
4-aminopyridine-N-oxide hydrochloride
3-aminopyridine dihydrochloride
Di(4-aminopyridinium) tartrate
Di(4-aminopyridinium) sulfate
2-aminopyridinium bromide
3-amino-2,6-dimethylpyridine dihydrochloride
4-amino-2,6-dimethylpyridinium propionate
4-(N,N-dimethylamino) pyridine-N-oxide hydroiodide
4-aminoquinolinium fluoride
3-amino-2-ethylpyridinium nitrate
Tri(4-amino-2-methyl-5-ethylpyridinium) phosphate
3-aminoisoquinolinium nitrate
4-aminopyridinium butyrate
4-aminopyridinium benzoate
Di(3-amino-2-methylpyridinium) phthalate
Di(4-amino-2,3,6-trimethylpyridinium) oxalate
Di(3-nitroquinolinium) malonate
Di(4-pyridylammonium) succinate
Tri(4-aminopyridinium) citrate
Di(3-aminopyridinium) fumarate, and the like The preferred compounds of the above listed materials are the salts of the aminopyridines, particularly the chlorides and sulphates of aminopyridines. The most preferred single compound is the monohydrochloride of 4-aminopyridine, the salt ordinarily being atached to the pyridine nitrogen. This compound can be named 4-aminopyridinium chloride (4-aminopyridine hydrochloride).

It is also within the scope of the invention to utilize the peanut butter-milled grain bait composition of the invention in combination with other bird management chemicals such as the 1,5-pentamethylenetetrazole compounds, e.g., metrazole, set forth and defined in copending application of Goodhue et al., Serial No. 175,834, filed February 26, 1962.

Many of the bird management chemicals defined above can be purchased from commercial sources. Synthesis of heterocyclic nitrogen compounds defined above can be accomplished by conventional techniques, such as set forth in the above copending applications and U.S. Patent 3,044,930, supra. For example, pyridine-N-oxide can be formed by reacting pyridine with hydrogen peroxide, charged for example as 30 percent aqueous $H_2O_2$. With acetic acid present in a 4/1 molar ratio of acetic acid to pyridine, the acetic acid serves as an oxygen carrier, forming peracetic acid in situ. Such a reaction can be carried out, for example, at about 85° C. for 10 hours. Likewise, reduction of nitro-substituted compounds under rather severe conditions will reduce the nitro group to an amino group and remove the oxide group. Also, if the salt is desired, a suitable heterocyclic nitrogen compound can be reacted with the desired organic or inorganic acid to form the corresponding salt.

The bird management chemicals can be applied to the bait as a concentrate or in combination with a carrier or other inert materials, the important consideration being that the material with which the composition of the invention is to be treated penetrates readily into the composition under the conditions of pressure and temperature existing at the time of treatment. The solvent, where one is employed, should be substantially inert with respect to the active bird management compound. Some examples of specific carrier materials that can be employed are water, acetone, deodorized kerosene, naphthas, isoparaffinic hydrocarbon fractions boiling in the range of about 260 to 300° F. (Soltrol) and the like as well as mixtures thereof. Mixtures of the above defined heterocyclic nitrogen-containing compounds can be employed as well as mixtures of one or more of these compounds with other bird management chemicals.

The amount of peanut butter employed in the composition of the invention can vary over a rather wide range. Generally, however, the ratio of peanut butter to the milled grain, e.g., corn meal, corn grits and the like, ranges from 1:1 to 1:6 on a weight basis. Ordinarily, a sufficient amount of peanut butter is mixed with the milled grain, which is preferably treated with one of the above defined compounds, to provide an attractive bait for the birds, i.e., the grain is substantially covered with peanut butter.

The compositions of the invention can be prepared in any suitable manner such as mixing the milled grain with the peanut butter in a drum mixer or any type of stirred vessel. When using a bird control chemical such as 4-aminopyridine or 4-nitropyridine-N-oxide, or salts of amino-substituted pyridines, it is most convenient to apply the bird control chemical to the milled grain prior to mixing the treated grain with the peanut butter. The amount of bird control chemical which is incorporated into the milled grain will generally range from 0.01 to 10 percent by weight based on the milled grain, preferably from 0.02 to 2 weight percent on the same basis. In actual operation, grain treated at the higher concentrations, for example, above about 1 percent of the above defined heterocyclic nitrogen-containing compounds functions as an avicide since the mortality rate rapidly increases with increasing concentrations of bird management chemical in the food consumed. Actually, even at the higher concentrations, the birds convulse and cry out before they die. At concentrations less than about 1 percent in the treated food, the chemical functions primarily as a bird management chemical wherein the birds after ingesting some of the compound emit warning cries and distress calls, but do not necessarily die, thereby causing other birds nearby to leave and not return to the area for some time. Actually, ingestion of small amounts of bird management chemicals causes convulsions and/or paralysis of the birds and during the period of convulsions and/or paralysis, the birds emit cries.

Recently, it has been found that grain treated with certain of the above defined heterocyclic nitrogen-containing compounds, particularly the nitro-substituted compounds, develop an odor and become badly discolored. Thus, it is within the scope of the present invention to treat the grain with a material selected from the group consisting of sodium bisulphite, sodium hydrosulfite, sodium thiosulfate and sulfur dioxide to retard color formation caused by nitro-substituted heterocyclic compounds. Treatment of grain with the above described materials is described and claimed in copending application of Snyder et al. having Serial No. 218,852, filed August 23, 1962.

Ingestion of a sufficient amount of at least one of the bird management compounds defined above by one or more birds produces symptoms such as tremors, loss of flight, fluttering, paralysis and warning and distress cries. The result is that other birds upon seeing birds having convulsions, or suffering from paralysis and hearing the distress cries emitted by affected birds, even entire flocks of birds will leave an area and stay away from an area for long periods of time. The amount of effective compound which must be ingested by a bird to get the desired effect is generally within the range of 3 to 500 mg. of the active ingredient per kg. weight of bird, usually in the range of 5 to 100 mg./kg., most of the compounds utilized being effective in amounts less than 50 mg./kg. Since one wishing to clear an area of birds by the method of the invention has no control over the amount of material a bird will eat, it is impossible to specify exactly what dose will be applied to birds under actual conditions.

The following examples illustrate the effectiveness of the compounds of the present invention but are not intended, however, to unduly limit the scope of the invention.

*Example I*

A field test was made in which a bait comprising peanut butter and corn meal was employed for the control of starlings.

In this test, the above described bait, containing a bird control chemical was employed for starling control at a hog feeder lot in the Middle West at which it was estimated there were 2,000 to 3,000 starlings feeding on stray grain. Two hog feeder troughs were used for baiting starlings into accepting the candidate bait. Four baits containing no control chemical were first used, these baits comprising hamburger meat plus corn meal, peanut butter plus corn meal, corn meal alone and a hog feed which was a supplement feed containing cracked corn. The starlings were observed to eat the peanut butter-corn meal mixture which contained 25 percent peanut butter and 75 percent corn meal but very little of the other baits were eaten by the birds.

Accordingly, a treated bait was then put out. The bait was made by impregnating #6 corn grits with an aqueous solution of 4-aminopyridine hydrochloride sufficient to provide 1 percent by weight 4-aminopyridine hydrochloride (4-aminopyridinium chloride) in the grain and thereafter mixing 3 parts of the treated corn grits with 1 part of peanut butter. This treated bait was placed in the area frequented by the starlings, and the starlings began feeding immediately. Twenty minutes later, over half of the flock acted very disturbed and flew off, and one minute later almost all of the flock had left. Twenty-three minutes after the treated bait was put out, a starling was observed giving violent distress calls. For the next fifteen minutes, starlings having convulsions and giving distress calls were seen throughout the area. The same general pattern was repeated a number of times during the day, small flocks of starlings flying in, being affected by the bait and leaving. Within four hours after the test began, the area was practically clear of starlings.

By use of the above-tested bait at various intervals, it has been possible to maintain this particular feeder lot practically clear of starlings. The estimated mortality out of the 3,000 starlings was approximately 10 percent.

*Example II*

Milled grain such as corn grits is impregnated with a solution of a bird management chemical in an amount sufficient to provide 1 percent by weight chemical based on the grain. The following chemicals are used to impregnate the grain: 4-aminopyridine, 4-aminopyridine-N-oxide, 4-amino-3-picoline-N-oxide, 4-nitropyridine, and 3-aminopyridine. The grain treated with each chemical is then mixed with peanut butter in an amount sufficient to coat the treated grain with peanut butter so as to provide an attractive bait. This bait is then distributed in an area frequented by feeding pigeons, starlings, sparrows, cowbirds and grackles. Birds ingesting the treated grain dispersed in the peanut butter are soon affected as evidenced by convulsions and warning cries. These effects serve to drive the other birds from the area.

Example III

Milled grain such as corn grits is impregnated with a solution of 4-nitropyridine-N-oxide in an amount sufficient to provide 1 percent by weight 4-nitropyridine based on the grain. The grain is treated with 5 percent by weight sodium bisulfite solution to prevent discoloration and odor. The grain is then mixed with peanut butter in an amount sufficient to coat the treated grain with peanut butter. This bait is then distributed in an area frequented by feeding pigeons, starlings, sparrows, cowbirds and grackles. Birds ingesting the treated grain dispersed in the peanut butter are soon affected as evidenced by convulsions and warning cries. These effects serve to drive the other birds away from the area.

As will be evident to those skilled in the art, many variations and modifications of this invention can be practiced in view of the foregoing disclosure. Such variations and modifications are clearly believed to come within the spirit and scope of the invention.

I claim:

1. A bird control composition and bait effective for controlling starlings comprising milled grain impregnated with from 0.01–10 weight percent of a bird management chemical dispersed in peanut butter, the weight ratio of peanut butter to grain being in the range 1:1 to 1:6.

2. A bird control composition and bait effective for controlling starlings comprising milled grain impregnated with from 0.02–2 weight percent of a 4-aminopyridine salt in admixture with peanut butter, the weight ratio of peanut butter to milled grain being in the range 1:1 to 1:6.

3. The composition of claim 2 wherein said salt is 4-aminopyridine hydrochloride.

4. A bird control composition and bait comprising 3 weight parts of milled corn impregnated with 1 weight percent 4-aminopyridine hydrochloride in admixture with 1 weight part peanut butter.

5. A method for reducing the number of live starlings in an area which comprises placing in said area a bird food containing from 0.01 to 10 percent by weight, based on said food, of a heterocyclic nitrogen-containing compound having a structural formula selected from the group consisting of

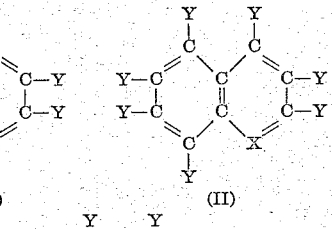

and salts thereof, wherein (1) X is selected from the group consisting of $$-N= \quad \text{and} \quad -N=$$
$$\quad\quad\quad\quad\quad\quad\quad\;\; \downarrow$$
$$\quad\quad\quad\quad\quad\quad\quad\;\; O.nH_2O$$

(2) $n$ is 0 through 2, (3) Y is selected from the group consisting of hydrogen, chlorine, nitro, bromine, alkyl and alkoxy containing from 1–4 carbon atoms, inclusive, aralkoxy containing from 7–10 carbon atoms, inclusive, and

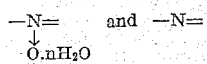

wherein R is selected from the group consisting of hydrogen and alkyl containing from 1–4 carbon atoms, and wherein at least one Y is selected from the group consisting of nitro and

and (4) said salts are selected from the group consisting of chloride, bromide, iodide, fluoride, nitrate, sulfate, phosphate, nitrite, acetate, propionate, butyrate, oxalate, malonate, succinate, tartrate, phthalate, benzoate and citrate, dispersed in peanut butter, the weight ratio of peanut butter to bird food being in the range 1:1 to 1:6.

6. A method according to claim 5 wherein said starlings are first attracted into said area with bait.

7. A bird management composition effective for controlling starlings comprising a bird food containing from 0.01 to 10 percent by weight, based on said food, of a heterocyclic nitrogen-containing compound having a structural formula selected from the group consisting of

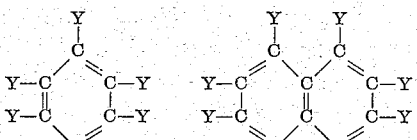

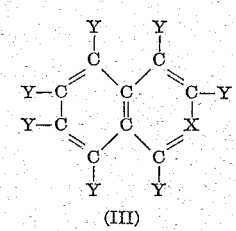

and salts thereof, wherein (1) X is selected from the group consisting of $$-N= \quad \text{and} \quad -N=$$
$$\quad\quad\quad\quad\quad\quad\quad\;\; \downarrow$$
$$\quad\quad\quad\quad\quad\quad\quad\;\; O.nH_2O$$

(2) $n$ is 0 through 2, (3) Y is selected from the group consisting of hydrogen, chlorine, nitro, bromine, alkyl, and alkoxy containing from 1–4 carbon atoms, inclusive, aralkoxy containing from 7–10 carbon atoms, inclusive, and

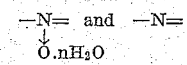

wherein R is selected from the group consisting of hydrogen and alkyl containing from 1–4 carbon atoms, and wherein at least one Y is selected from the group consisting of nitro and

and (4) said salts are selected from the group consisting of chloride, bromide, iodide, fluoride, nitrate, sulfate, phosphate, nitrite, acetate, propionate, butyrate, oxalate, malonate, succinate, tartrate, phthalate, benzoate and citrate, dispersed in peanut butter, the weight ratio of peanut butter to bird food ranging from 1:1 to 1:6.

8. A bird management composition according to claim 7 which comprises a grain, as said food, impregnated with from 0.02 to 2 weight percent, based on said grain, of a heterocyclic nitrogen-containing compound as defined in claim 7, dispersed in peanut butter.

9. The composition of claim 8 wherein said compound is 4-aminopyridine.

10. The composition of claim 8 wherein said compound is 4-aminopyridine hydrochloride.

11. An ingestible composition effective for controlling starlings comprising peanut butter having incorporated therein an effective amount of a heterocyclic nitrogen-containing compound as defined in claim 7.

12. An ingestible composition effective for controlling starlings comprising peanut butter having incorporated therein an effective amount of bird management agent.

13. A bird management composition effective for controlling starlings comprising (a) a heterocyclic nitrogen-containing compound having a structural formula selected from the group consisting of

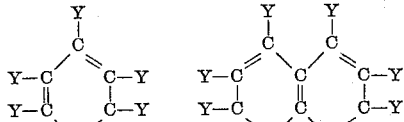

(I)        (II)

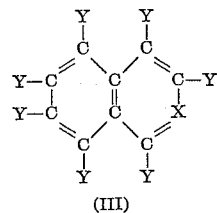

(III)

and salts thereof, wherein (1) X is selected from the group consisting of

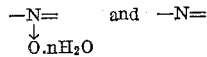

(2) $n$ is 0 through 2,
(3) Y is selected from the group consisting of hydrogen, chlorine, nitro, bromine, alkyl and alkoxy containing from 1–4 carbon atoms, inclusive, aralkoxy containing from 7–10 carbon atoms, inclusive, and

wherein R is selected from the group consisting of hydrogen and alkyl containing from 1–4 carbon atoms, and wherein at least one Y is selected from the group consisting of nitro and

and
(4) said salts are selected from the group consisting of chloride, bromide, iodide, fluoride, nitrate, sulfate, phosphate, nitrite, acetate, propionate, butyrate, oxalate, malonate, succinate, tartrate, phthalate, benzoate and citrate, (b) a material that will carry said compound into a bird's system containing from 0.01 to 10 percent by weight, based on said material, of said compound, and (c) peanut butter, the weight ratio of peanut butter to said material ranging from 1:1 to 1:6.

14. The composition of claim 13 wherein said compound is 4-aminopyridine.

15. The composition of claim 13 wherein said compound is 4-aminopyridine hydrochloride.

References Cited by the Examiner
UNITED STATES PATENTS 3,044,930   7/62   Goodhue et al. _____ 167—46

OTHER REFERENCES

Hays et al.: J. of Economic Entomology, vol. 53, No. 2, April 1960, pp. 188–191.

JULIAN S. LEVITT, *Primary Examiner.*

MORRIS O. WOLK, LEWIS GOTTS, *Examiners.*